United States Patent
Liu (10) Patent No.: US 9,997,937 B2
(45) Date of Patent: Jun. 12, 2018

(54) ELECTRONIC CIGARETTE CHARGING APPARATUS

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days. days.

(21) Appl. No.: 15/024,361

(22) PCT Filed: Sep. 25, 2013

(86) PCT No.: PCT/CN2013/084231
§ 371 (c)(1),
(2) Date: Mar. 24, 2016

(87) PCT Pub. No.: WO2015/042812
PCT Pub. Date: Apr. 2, 2015

(65) Prior Publication Data
US 2016/0233705 A1    Aug. 11, 2016

(51) Int. Cl.
*A24F 7/02* (2006.01)
*A24F 13/02* (2006.01)
(Continued)

(52) U.S. Cl.
CPC .......... *H02J 7/0045* (2013.01); *A24F 47/008* (2013.01); *B65D 85/70* (2013.01); *H02J 7/0044* (2013.01)

(58) Field of Classification Search
CPC ..... A24F 47/008; A24F 47/002; A61M 11/00; A61M 15/00
(Continued)

(56) References Cited

U.S. PATENT DOCUMENTS

2010/0308481 A1* 12/2010 Oglesby ................. F23C 6/04
                                                                 261/131
2013/0063077 A1* 3/2013 Popper ................. H02J 7/0045
                                                                 320/107
(Continued)

FOREIGN PATENT DOCUMENTS

CN            202474905 U        10/2012

OTHER PUBLICATIONS

International Search Report of PCT Patent Application No. PCT/CN2013/084231 dated Jul. 9, 2014.

*Primary Examiner* — Abdullah Riyami
*Assistant Examiner* — Thang Nguyen (57) ABSTRACT

An electronic cigarette charging apparatus used for charging a battery rod (100) of an electronic cigarette. One end of the battery rod (100) is provided with a first electrode (101) and a second electrode (102) both electrically connected to the electronic cigarette charging apparatus. The electronic cigarette charging apparatus includes a first magnetic charging electrode (2). The first charging electrode (2) is provided with at least one butted curved surface corresponding to the position of the first electrode (101) or the second electrode (102). During the charging, the first charging electrode (2) abuts against and is in magnetic attraction with the first electrode (101) or the second electrode (102) to form conductive connection. The implementation of the electronic cigarette charging apparatus has the beneficial effects: the electronic cigarette charging apparatus can increase the
(Continued)

contact area of the charging electrode (2) and the battery rod (100), and the charging is stable.

13 Claims, 5 Drawing Sheets

(51) Int. Cl.
*H02J 7/00* (2006.01)
*A24F 47/00* (2006.01)
*B65D 85/00* (2006.01)

(58) Field of Classification Search
USPC .................................................. 131/225–228
See application file for complete search history.

(56) References Cited

U.S. PATENT DOCUMENTS

| | | | | |
|---|---|---|---|---|
| 2013/0169230 A1* | 7/2013 | Li | ......................... | H02J 7/0044 |
| | | | | 320/114 |
| 2014/0366895 A1* | 12/2014 | Li | ....................... | H01M 2/1055 |
| | | | | 131/329 |
| 2016/0143357 A1* | 5/2016 | Liu | ....................... | H02J 7/0045 |
| | | | | 206/223 |

\* cited by examiner

Figure 9

ELECTRONIC CIGARETTE CHARGING APPARATUS

TECHNICAL FIELD

The present application relates to an electronic product, and more particularly relates to an electronic cigarette charging apparatus.

BACKGROUND

Electronic cigarettes are used for smoking cessation and substitute for traditional cigarettes. An electronic cigarette available in the market includes a battery rod and an atomizer. When a smoking action is taking place, a battery in the battery rod supplies power to the atomizer, driving heating wires to emit heat, and thus tobacco tar is atomized and smoke is further produced as a result. The electronic cigarette is an electronic product which consumes a lot of current for only an instant. Due to the limitation of the battery capacity of the electronic cigarette, a user can continue to use the electronic cigarette only after the battery is charged.

At present, most of the electronic cigarette charging apparatus employ an elastic sheet electrode as the charging electrode, which has a smaller contact area with the electronic cigarette battery rod. Therefore, the electronic cigarette charging apparatus needs to fix the electronic cigarette via the locking glue when charging the latter, so as to prevent the electronic cigarette from inclining during the charging process which may result in instable charging current. In such a way, additional locking glue is needed for fixing the electronic cigarette when producing the electronic cigarette charging apparatus by the manufacturers, which not only increases the cost, but also greatly affects the stability of the charging process as the frequent press of the metal elastic sheet would fatigue it and finally fail it.

SUMMARY

An objective of this application is, aimed to the disadvantages in the prior art that the charging electrode of the prior electronic cigarette charging apparatus has a smaller contact area with the battery rod of the electronic cigarette and an additional locking glue is needed for fixing the battery rod, providing an electronic cigarette charging apparatus which is capable of increasing the contact area between the charging electrode and the battery rod of the electronic cigarette, and charging the battery rod stably.

According to a first aspect, an electronic cigarette charging apparatus is provided for charging a battery rod of an electronic cigarette. One end of the battery rod is provided with a first electrode and a second electrode both electrically connected to the electronic cigarette charging apparatus. The electronic cigarette charging apparatus includes a first charging electrode having a magnetic property. The first charging electrode is provided with at least one butted curved surface corresponding to a position of the first electrode or the second electrode. During the charging, the first charging electrode butts against and is in magnetic attraction with the first electrode or the second electrode to form a conductive connection.

In the electronic cigarette charging apparatus according to the present application, the first charging electrode includes at least one magnetic attraction mechanism, the first electrode or the second electrode includes at least one metal positioning piece for magnetic attraction. The first charging electrode is in magnetic attraction connection with the metal positioning piece via the magnetic attraction mechanism.

In the electronic cigarette charging apparatus according to the present application, the magnetic attraction mechanism can be a magnetic layer arranged on the butted curved surface, or a magnetic block fixed on the first charging electrode.

In the electronic cigarette charging apparatus according to the present application, the metal positioning piece can be made from any material selected from iron, cobalt and nickel.

In the electronic cigarette charging apparatus according to the present application, the second electrode is arranged on an end surface of the electronic cigarette, and the butted curved surface can be a spherical surface.

In the electronic cigarette charging apparatus according to the present application, the butted curved surface can be an annular inclined surface adapting to a shape of the first electrode.

In the electronic cigarette charging apparatus according to the present application, the electronic cigarette charging apparatus further includes a mounting base comprising a main body, a first accommodation cavity for accommodating the first charging electrode is formed inside the main body.

The main body is provided with a first through hole communicated with the first accommodating cavity on a first end surface of the main body facing the battery rod, wherein, the first charging electrode is inserted into the first through hole.

In the electronic cigarette charging apparatus according to the present application, the first accommodating cavity is provided with a second elastic sheet on a wall surface away from the first end surface. One end of the first charging electrode away from the battery rod is elastically butted against the second elastic sheet, other end of the first charging electrode adjacent to the battery rod passes through the first through hole to butt against and magnetically attract the second electrode.

In the electronic cigarette charging apparatus according to the present application, the electronic cigarette charging apparatus further includes a first elastic sheet comprising a second charging electrode elastically butting against the first electrode and a connection part bending from the second charging electrode.

The second charging electrode is provided with a second through hole for passing through the first charging electrode. The second through hole is arranged at intervals with a circumference of the first charging electrode. A first connection part is fixedly connected on a side wall adjacent to the first end surface.

In the electronic cigarette charging apparatus according to the present application, the side wall is provided with a first elastic sheet mounting groove which is provided with at least one first buckle.

The first connection part is arranged with at least one first clamping groove adapting to the first buckle. The first elastic sheet is buckled into the first elastic sheet mounting groove via the first buckle.

In the electronic cigarette charging apparatus according to the present application, the electronic cigarette charging apparatus further includes a PCB board arranged with a charging circuit. The main body has a second end surface, the PCB board passes through the first accommodating cavity vertically and is fixed on the second end surface.

A side of the connection part facing the PCB board extends and protrudes to from a butt portion which butts against the PCB board. One side of the second elastic sheet away from the first accommodating cavity extends and butts against the PCB board.

In the electronic cigarette charging apparatus according to the present application, the electronic cigarette charging apparatus further includes a third charging electrode in a form of an elastic sheet.

In the electronic cigarette charging apparatus according to the present application, an end surface of the first charging electrode adjacent to the battery rod is provided with a groove adapting to the battery rod. The first charging electrode butts against and is in magnetic attraction with the first electrode of the battery rod inserted into the groove.

An end surface of the first charging electrode away from the battery rod is provided with a third through hole communicated with the groove. The third charging electrode passes through the third through hole and butts against the second electrode of the battery rod inserted into the groove.

In the electronic cigarette charging apparatus according to the present application, the electronic cigarette charging apparatus further includes a PCB board arranged with a charging circuit. One end of the first charging electrode away from the battery rod is provided with a clamping groove on a circumferential lateral wall. One end of the PCB board butts against the clamping groove to form a conductive connection.

In the electronic cigarette charging apparatus according to the present application, one end of the third charging electrode adjacent to the battery rod butts against the second electrode to form a conductive connection. One end of the third charging electrode away from the battery rod extends, and then bends to be fixed on the PCB board to form a conductive connection.

In the electronic cigarette charging apparatus according to the present application, the electronic cigarette charging apparatus can be an electronic cigarette case.

When implementing the electronic cigarette charging apparatus according to the present application, following advantageous or effects can be obtained. The electronic cigarette charging apparatus can be configured as an electronic cigarette case which is capable of placing an electronic cigarette and charging the same. In such a way, the electronic cigarette can be charged when it is placed in the electronic cigarette case, thus facilitate carrying of the electronic cigarette charging apparatus. A magnetic pole charging electrode comprising a pair of butted curved surfaces formed by a magnetic attraction mechanism, is used for charging the electronic cigarette in the present application. During the charging process, the magnetic attraction mechanism butts against and is in magnetic attraction with the metal positioning piece to form a conductive connection, thus increasing the contact surface between the charging electrode and the electronic cigarette. Furthermore, the butted curved surfaces can prevent the electronic cigarette from deviating in the horizontal direction from the charging electrode. The butting of the curved surfaces can be accurate, thus preventing the deviation of the charging electrode from the electronic cigarette caused by vibration, so that stability of the electronic cigarette charging apparatus in charging process is effectively improved.

BRIEF DESCRIPTION OF THE DRAWINGS

The present application is further illustrated combining the embodiments of present application and the attached drawings.

DETAILED DESCRIPTION OF THE PREFERRED EMBODIMENT

Hereinafter, embodiments of the present application will be described in detail with reference to the accompanying drawings, such that a better understanding of the technical feature, object and effect of the present application can be obtained.

Figure 1:
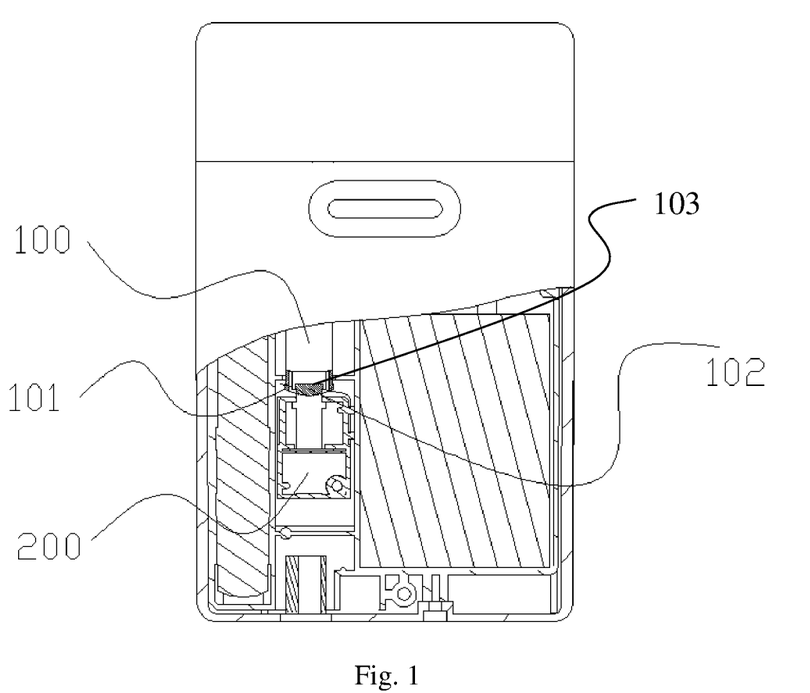
FIG. 1 is a structural diagram showing the electronic cigarette charging apparatus according to a first preferable embodiment of present application.

FIG. 1 is a structural diagram showing the electronic cigarette charging apparatus according to a first preferable embodiment of present application. As shown in FIG. 1, the electronic cigarette charging apparatus can be an electronic cigarette case which is capable of placing an electronic cigarette and charging the same. The electronic cigarette charging apparatus is provided for charging a battery rod 100 of an electronic cigarette. One end of the battery rod 100 is provided with a first electrode 101 and a second electrode 102 both electrically connected to the electronic cigarette charging apparatus. Combining FIG. 1 and FIG. 2, the electronic cigarette charging apparatus includes charging components 200 comprising the mounting base 1, the first charging electrode 2, the first elastic sheet 3 and the second elastic sheet 4. The first charging electrode 2 is provided with at least one butted curved surface corresponding to the position of the second electrode 102. The butted curved surface can be a spherical surface. During the charging, the first charging electrode 2 butts against and is in magnetic attraction with the second electrode 102, and meanwhile, the first elastic sheet 3 and the first electrode 101 are conductively contacted. In such a way, a charging circuit is formed. The butted curved surface can be designed in any shape other than a planar end surface to increase attached contact surface, thus overcoming defects in the prior art, such as smaller contact surface and instable charging.

Figure 2:
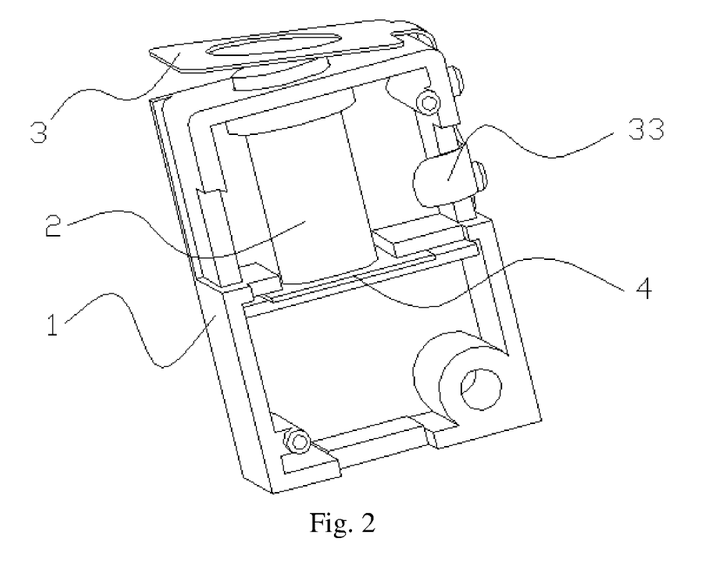
FIG. 2 is a structural diagram showing the charging components in the electronic cigarette charging apparatus according to a first preferable embodiment of present application.
Figure 5:
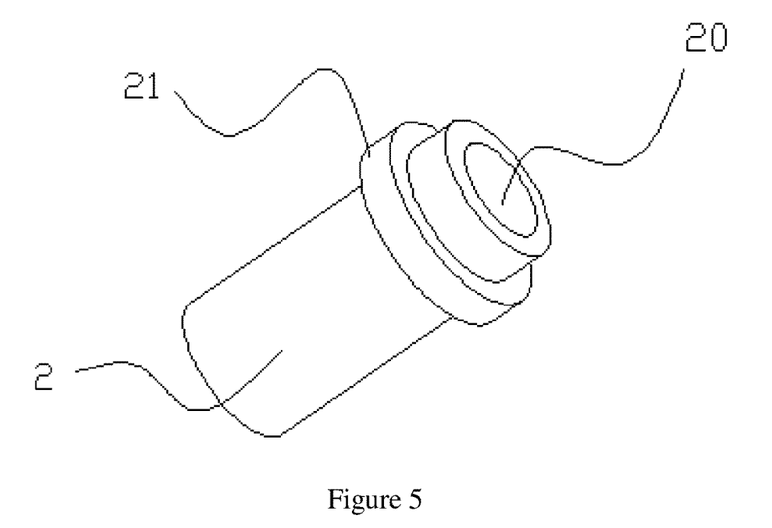
FIG. 5 is a structural diagram showing the first charging electrode of the charging components shown in FIG. 2.

As shown in FIGS. 1, 2 and 5, the first charging electrode 2 is provided with at least one magnetic attraction mechanism 20 on one end facing the battery rod 100. The magnetic attraction mechanism 20 can be a magnetic layer arranged on the butted curved surface, or a magnetic block fixed on the first charging electrode 2. The magnetic attraction mechanism 20 is made from magnetic materials. The first charging electrode 2 is in magnetic attraction connection with the second electrode 102 via the magnetic attraction mechanism 20. The second electrode 102 includes at least one metal positioning piece 103 for magnetic attraction. The metal positioning piece 103 can be made from any material selected from iron, cobalt and nickel. It can be understood that, there are a plurality of magnetic blocks arranged at intervals on the end surface of the first charging electrode 2 facing the battery rod 100. The first charging electrode 2 can also be made from a single piece of magnetic material.

Figure 3:
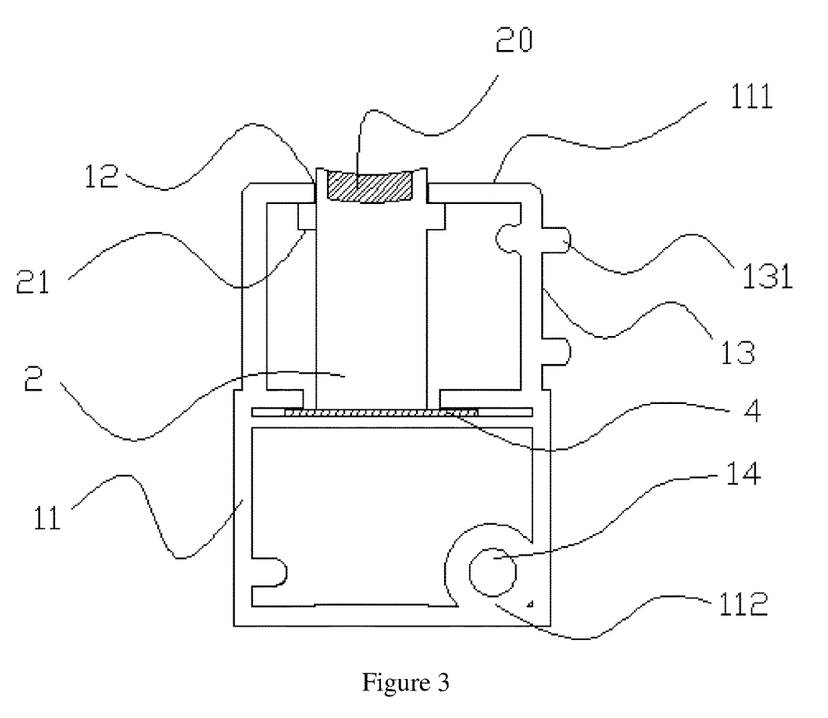
FIG. 3 is a structural diagram showing the mounting base of the charging components shown in FIG. 2.

Referring FIGS. 2 and 3, the mounting base 1 includes a main body 11, a first through hole 12, a first elastic sheet mounting groove 13 and a mounting hole 14. The main body 11 is approximately a hollow rectangular parallelepiped with a first accommodation cavity (unshown) for accommodating the first charging electrode 2 and a second accommodation cavity (unshown) formed inside. The second accommodation cavity is arranged at intervals with the first accommodation cavity. The first accommodation cavity is arranged on one side of the main body 11 adjacent to the battery rod 100. The main body 11 is provided with a first end surface 111 adjacent to the battery rod 100, and a second end surface 112. The first through hole 12 is arranged on the first end surface 111, and the mounting hole 14 is arranged on the second end surface 112.

The first through hole 12 arranged on the first end surface 111 adjacent to the battery rod 100, is communicated with the first accommodating cavity. The first through hole 12 has a pole structure adapting to the first charging electrode 2 which passing through the main body 11 and being inserted into the first through hole 12.

The first elastic sheet mounting groove 13 is arranged on one side wall of the main body 11 adjacent to the first end surface 111 and is provided with at least one first buckle 131 having a section shape of circular or polygonal and so on. If there are a plurality of first buckles 131, such first buckles 131 are arranged on the first elastic sheet mounting groove 13 at intervals. The first elastic sheet is buckled into the main body 11 via the first buckle 131.

Figure 4:
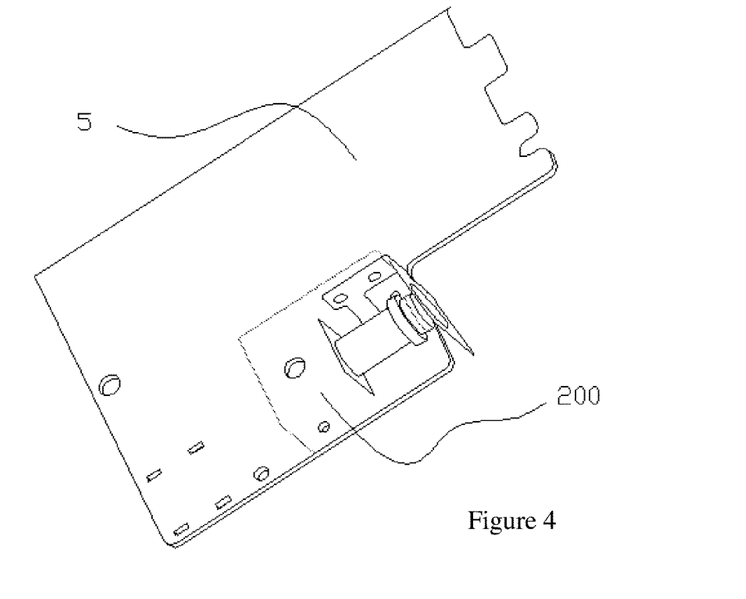
FIG. 4 is a structural diagram showing the connection between the PCB board and the charging components shown in FIG. 2.

Furthermore, as shown in FIGS. 4 and 3, the electronic cigarette charging apparatus further includes a PCB board 5 arranged with necessary charging circuits, which are detachably mounted on the second end surface 112 of the mounting base 1 via a fastener. The connection hole 15 of the mounting base 1 cooperates with the fastener to pass the PCB board 5 through the first accommodation cavity and the second accommodation cavity and fix the PCB board 5 on the second end surface 112. The PCB board 5 is electrically connected to one end of the first elastic sheet 3 and the second elastic sheet 4.

Furthermore, as shown in FIGS. 5 and 3, the first charging electrode 2 has a pole structure with a flange 21 arranged at the circumferential lateral wall on one side adjacent to the battery rod 100. The flange 21 extends along a direction away from the middle axis of the first charging electrode 2. One end of the first charging electrode 2 adjacent to the flange 21 passes through the first through hole 12 and butts against the second electrode 102 of the battery rod 100 via a magnetic force. The flange 21 further butts against the wall surface of the first accommodating cavity adjacent to the first end surface 111. One end of the first charging electrode 2 away from the flange 21 elastically butts against the second elastic sheet 4 on the wall surface of the first accommodating cavity away from the first end surface 111. The second elastic sheet 4 in an approximately sheet shape is fixed on the wall surface of the first accommodating cavity adjacent to the first end surface 111. The second elastic sheet 4 further extends and butts against the PCB board 5 on the side away from the first accommodating cavity to form a conductive connection.

During the charging process, the battery rod 100 is inserted into the charging components 200. The first charging electrode is provided with at least one magnetic attraction mechanism 20, and the second electrode is provided with at least one metal positioning piece 103 made from any material selected from iron, cobalt and nickel. Accordingly, the first charging electrode 2 generates a magnetic force on the second electrode 102 of the battery rod 100, such that the first charging electrode 2 charges the second electrode 102 via magnetic butted connection, which is stable and has no elasticity failures. Therefore, the manufacturers do not need to add the locking glue for fixing the battery rod 100, because the battery rod 100 can be fixed perfectly via the magnetic connection. At present, most of the battery rods 100 have the second electrode 102 with a smooth spherical surface. However, in order to provide better conductive contact between the first charging electrode 2 and the second electrode 102, the end surface of the first charging electrode 2 contacting the second electrode 102 is designed as a spherical surface adapting to the end surface of the second electrode 102, such that the stability of the electronic cigarette charging apparatus during the charging process is improved. In additional, the magnetic force between the first charging electrode 2 and the second electrode 102 is more uniform, and the attachment between the first charging electrode 2 and the second electrode 102 is more stable.

Figure 6:
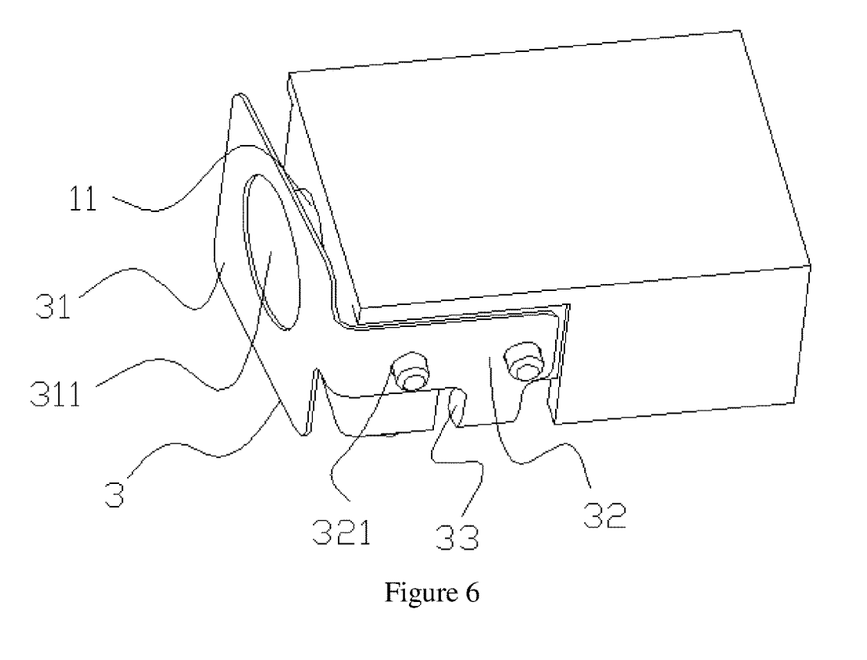
FIG. 6 is a structural diagram showing the connection between the mounting base and the first elastic sheet of the charging components shown in FIG. 2.

As shown in FIG. 6, the first elastic sheet 3 includes a second charging electrode 31 elastically butting against the first electrode 101, a first connection part 32 bending from one end of the second charging electrode 31, and a butt portion 33 bending and protruding from one side of the first connection part 32. The butt portion 33 butts against and elastically connects the PCB board 5 to form a conductive connection.

The first connection part 32 is arranged with at least one first clamping groove 321 at intervals which adapting to the first buckle 131 on the first elastic sheet mounting groove 13. The first clamping groove 321 has a section shape of circular or polygonal and so on. The first elastic sheet 3 is buckled into the first elastic sheet mounting groove 13 via the first clamping groove 321.

The second charging electrode 31 approximately has a sheet shape, and is provided with a second through hole 311 for passing through the first charging electrode 2. The second charging electrode 31 is sheathed on the first charging electrode 2 via the second through hole 311. The second through hole 311 is arranged at intervals with a circumference of the first charging electrode 2. That is, the second through hole 311 has a diameter which is larger than that of the first charging electrode 2, so there is an intervening space therebetween. Such that, the first charging electrode 2 and the second charging electrode 31 are electrically isolated. The second through hole 311 has a section shape of circular or polygonal and so on.

In addition, one end of the second charging electrode 31 connoted to the first connecting part 32 is a fixed end, and the other end of the second charging electrode 31 opposite to the connecting part 32 is a free end. Under a natural condition, the free end rises upwards, then the second charging electrode 31 and the first connecting part 32 form an angle greater than 90 degrees relative to the fixed end.

When the electronic cigarette is connected to the electronic cigarette charging apparatus, the free end of the second charging electrode 31 rotates towards the first end surface 111 around the fixed end under the attraction action of the magnetic force between the second electrode 102 and the first charging electrode 2, such that the second charging electrode 31 is attached to the first end surface 111 and conductively contacts the first electrode 101 of the battery rod 100, so as to form a charging circuit.

In the present embodiment, the battery rod 100 and the atomizer (unshown) are removable. The first electrode 101 and the second electrode 102 are arranged on one end of the battery rod 100 connected to the atomizer. The electronic cigarette can be the existing technology, and will not be described in detail. It can be understood that, the present application also can be used for charging an electronic cigarette whose battery rod 100 and atomizer are formed in one piece. At this time, the first electrode 101 and the second electrode 102 are arranged on one end of the battery rod 100 opposite to the atomizer.

The electronic cigarette charging apparatus further includes a power supply, a microprocessor and an electronic switch (Unshown). When the electronic cigarette is connected to the electronic cigarette charging apparatus, a charging trigger signal is generated. The microprocessor switches on the electronic switch to charge the battery rod 100 via the power supply after receiving the charging trigger signal. As the second elastic sheet 4 is conductively connected to the PCB board 5, the second elastic sheet 4 butts against the first charging electrode 2 to form a conductive connection. Meanwhile, the first charging electrode 2 magnetically contacts the second electrode 102 of the battery rod 100 to from a conductive connection. Accordingly, when the electronic cigarette charging apparatus is in the working state, the electric current flows through the second elastic sheet 4 and the first charging electrode 2, then to the rechargeable battery of the battery rod 100. On the other hand, the butt portion 33 of the first elastic sheet 3 is conductively connected to the PCB board 5, and the second charging electrode 31 of the first elastic sheet 3 is electrically connected to the first electrode 101 of the battery rod 100. Accordingly, when the electronic cigarette charging apparatus is in the working state, the electric current flows from the rechargeable battery of the battery rod 100 to the PCB board 5 via the second charging electrode 31, so as to form the charging circuit. In such a way, the electronic cigarette charging apparatus can stably charge the electronic cigarette.

It is understood that, in order to quickly charge the battery rod 100, the electronic switch can be replaced by a voltage regulation module to provide a suitable charging power supply for the electronic cigarette.

Figure 7:
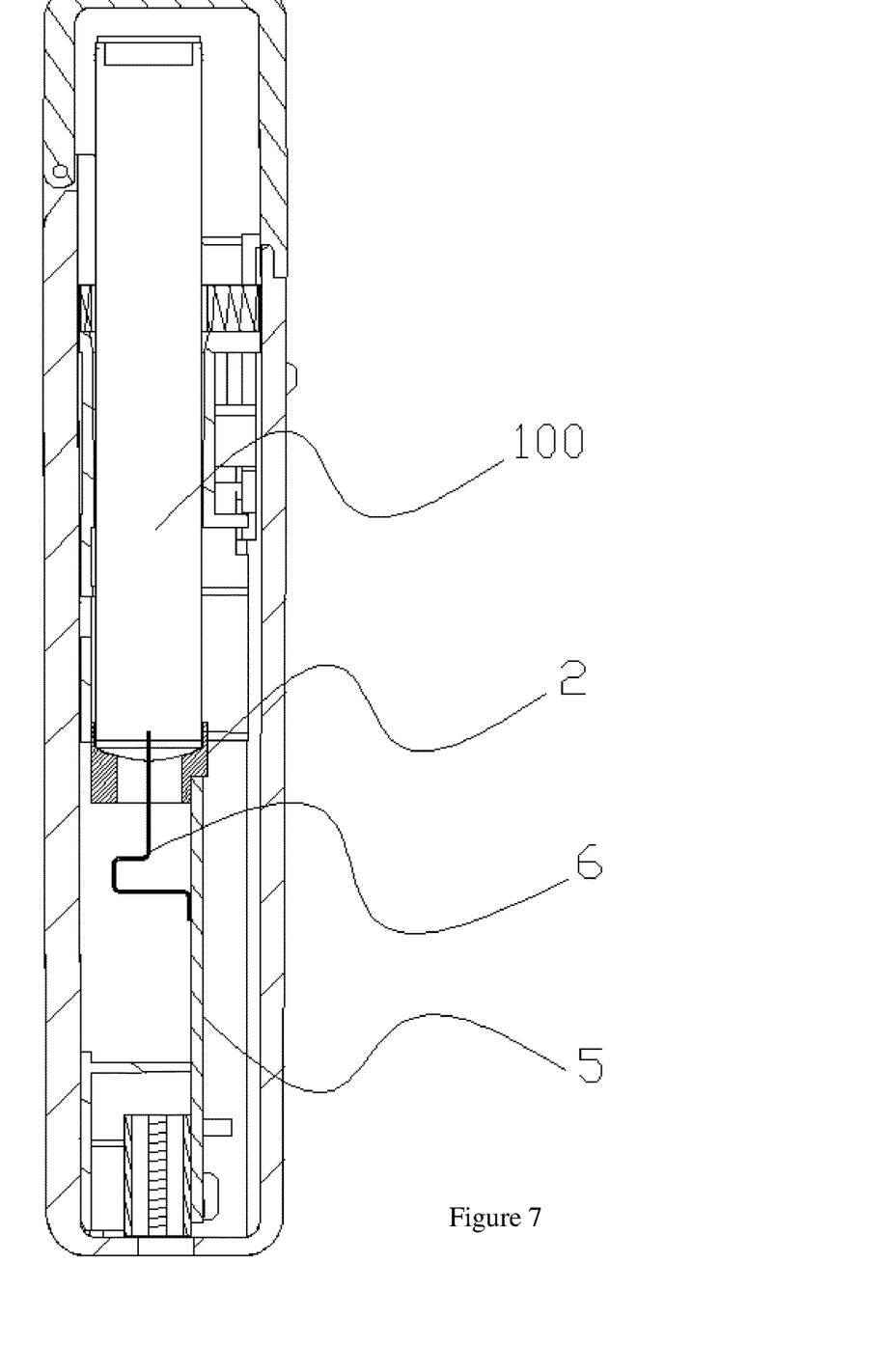
FIG. 7 is a structural diagram showing the electronic cigarette charging apparatus according to a second preferable embodiment of present application.

FIG. 7 is a structural diagram showing the electronic cigarette charging apparatus according to a second preferable embodiment of present application, which is different from the first preferable embodiment in that the charging component 200 includes a first charging electrode 2 and a third charging electrode 6, and the first electrode 101 of the battery rod 100 has at least one metal positioning piece 103 for magnetic attraction which is connected to the first charging electrode 2 via a magnetic attraction mechanism 20. In additional, the first charging electrode 2 is provided with at least one butted curved surface corresponding to the position of the second electrode 102. The butted curved surface can be an annular inclined surface. During the charging, the first charging electrode 2 butts against and is in magnetic attraction with the first electrode 101 to form a conductive connection. Meanwhile, the third charging electrode 6 conductively contacts the second electrode 102, so as to form a charging circuit.

The magnetic attraction mechanism 20 can be a magnetic layer arranged on the butted curved surface, or a magnetic block fixed on the first charging electrode 2. The magnetic attraction mechanism 20 is made from magnetic materials. It can be understood that, there are a plurality of magnetic blocks arranged at intervals on the end surface of the first charging electrode 2 facing the battery rod 100. The first charging electrode 2 can also be made from a single piece of magnetic material.

Figure 8:
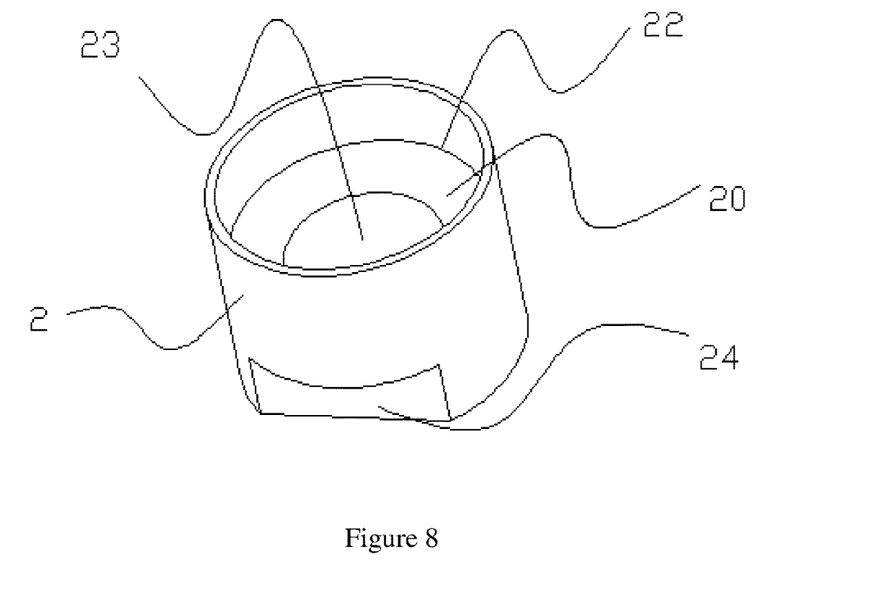
FIG. 8 is a structural diagram showing the first charging electrode of the electronic cigarette charging apparatus shown in FIG. 7.

As shown in FIG. 8, the end surface of the first charging electrode 2 adjacent to the battery rod 100 is provided with a groove 22 adapting to the battery rod. The end surface of the third charging electrode 6 away from the battery rod 100 is provided with a third through hole 23 communicated with the groove 22. The third charging electrode 6 passes through the third through hole 23 and butts against the battery rod 100 inserted into the groove 22. In additional, one end of the first charging electrode 2 away from the battery rod 100 is provided with a clamping groove 24 on a circumferential lateral wall. The PCB board 5 butts against the clamping groove 24.

Figure 9:
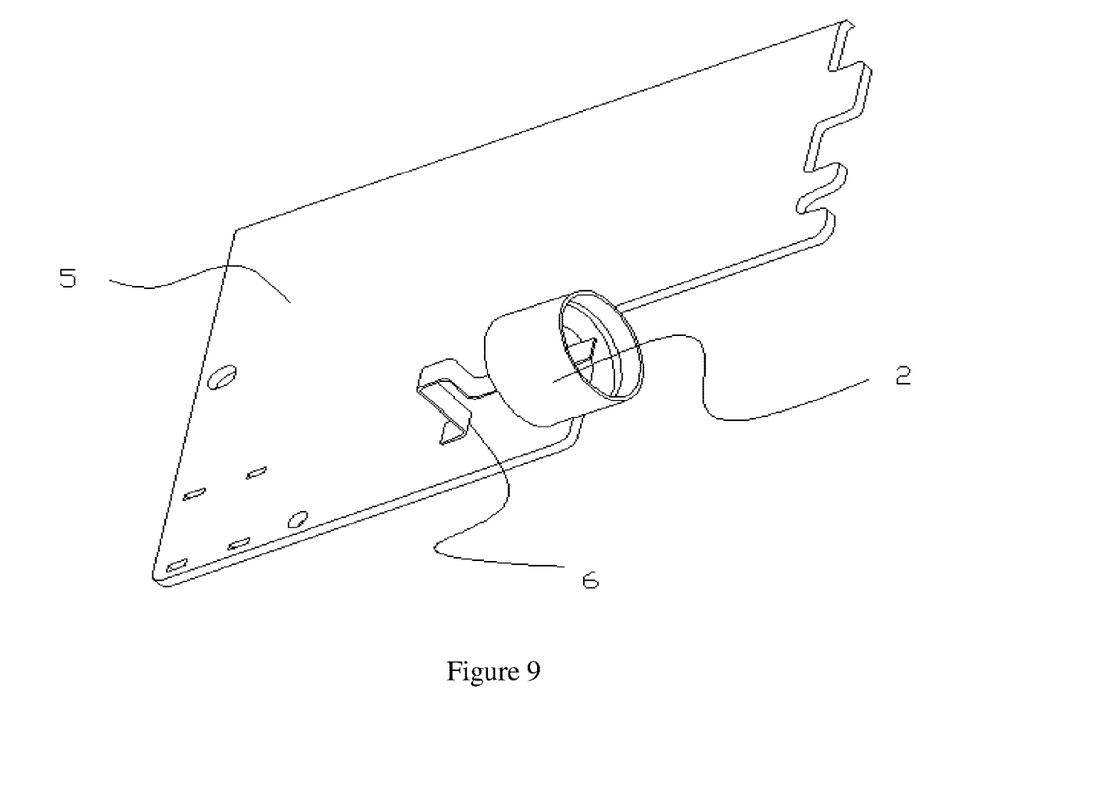
FIG. 9 is a structural diagram showing the connection between the PCB board and the charging components of the electronic cigarette charging apparatus shown in FIG. 7.

As shown in FIG. 9, the third charging electrode 6 is in a form of an elastic sheet, one end of which passes through the third through hole 23 and butts against the second electrode 102 of the battery rod 100 to form a conductive connection, and the other end of which bends and extends to butt against the PCB board 5. One end of the PCB board 5 butts against the clamping groove 24 to form a conductive connection.

During the charging, the battery rod 100 is inserted into the groove 22 on the first charging electrode. As at least one magnetic attraction mechanism 20 is provided on one end of the first charging electrode 2 facing the battery rod 100, and the first electrode 101 includes at least one metal positioning piece 103 for magnetic attraction which can be made from any material selected from iron, cobalt and nickel. Accordingly, the first charging electrode 2 generates a magnetic force on the first electrode 101 of the battery rod 100, such that the first charging electrode 2 charges the first electrode 101 via magnetic butted connection, which is stable and has no elasticity failures. Therefore, the manufacturers do not need to add the locking glue for fixing the battery rod 100, because the battery rod 100 can be fixed perfectly via the magnetic connection. At present, most of the battery rods 100 have the first electrode 101 with an annular inclined surface. However, in order to provide better conductive contact between the first charging electrode 2 and the first electrode 101, the end surface of the first charging electrode 2 contacting the first electrode 101 is designed as an annular inclined surface adapting to the end surface of the first electrode 101, such that the stability of the electronic cigarette charging apparatus during the charging process is improved. In additional, the magnetic force between the first charging electrode 2 and the first electrode 101 is more uniform, and the attachment between the first charging electrode 2 and the first electrode 101 is more stable.

As the third charging electrode 6 is conductively connected to the PCB board 5, and contacts the second electrode 102 of the battery rod 100 to from a conductive connection. Accordingly, when the electronic cigarette charging apparatus is in the working state, the electric current flows through the third charging electrode 6 to the rechargeable battery of the battery rod 100 (unshown). On the other hand, the first charging electrode 2 is conductively connected to the PCB board 5, and the first charging electrode 2 is further magnetically connected to the first electrode 101 to form a conductive connection. Accordingly, when the electronic cigarette charging apparatus is in the working state, the electric current flows from the rechargeable battery of the battery rod 100 to the PCB board 5 via the first charging electrode 2, so as to form the charging circuit. In such a way, the electronic cigarette charging apparatus can stably charge the electronic cigarette.

In summary, a magnetic pole charging electrode comprising a pair of butted curved surfaces formed by a magnetic attraction mechanism, is used for charging the electronic cigarette in the present application. During the charging process, the butted curved surfaces butt and are in magnetic attraction with the electrode end surface of the electronic cigarette. The butted curved surfaces enlarge the contact surface between the charging electrode and the electronic cigarette. Furthermore, the butted curved surfaces can prevent the electronic cigarette from deviating in the horizontal direction from the charging electrode. The butting of the curved surfaces can be accurate, thus preventing the deviation of the charging electrode from the electronic cigarette caused by vibration, so that stability of the electronic cigarette charging apparatus in charging process is effectively improved.

The foregoing description of the embodiment of the present application has been presented for purpose of illustration and description. It is intended to illustrate the present application rather than limit the application to the precise form disclosed. It should be understood that various changes, substitutions and alterations can be made hereto by one skilled in the art based on the motivation of the present application, without departing from the spirit and scope of the present application as described by the appended claims.

What claimed is:

1. An electronic cigarette charging apparatus for charging a battery rod (100) of an electronic cigarette, wherein one end of the battery rod (100) is provided with a first electrode (101) and a second electrode (102) both electrically connected to the electronic cigarette charging apparatus, wherein the electronic cigarette charging apparatus includes a first charging electrode (2) having a magnetic property, the first charging electrode (2) is provided with at least one butted curved surface corresponding to a position of the first electrode (101) or the second electrode (102), during a charging process, the first charging electrode (2) butts against and is in magnetic attraction with the first electrode (101) or the second electrode (102) to form a conductive connection;

wherein the electronic cigarette charging apparatus further includes a mounting base (1) comprising a main body (11), a first accommodation cavity for accommodating the first charging electrode (2) is formed inside the main body (11); wherein the main body (11) is provided with a first through hole (12) communicated with the first accommodating cavity on a first end surface (111) of the main body (11) facing the battery rod (100), wherein, the first charging electrode (2) is inserted into the first through hole (12);

wherein the first accommodating cavity is provided with a second elastic sheet (4) on a wall surface away from the first end surface (111), wherein one end of the first charging electrode (2) away from the battery rod (100) is elastically butted against the second elastic sheet (4), other end of the first charging electrode (2) adjacent to the battery rod (100) passes through the first through hole (12) to butt against and magnetically attract the second electrode (102).

2. The electronic cigarette charging apparatus according to claim 1, wherein the first charging electrode (2) includes at least one magnetic attraction mechanism (20), wherein the first electrode (101) or the second electrode (102) includes at least one metal positioning piece (103) for magnetic attraction, the first charging electrode (2) is in magnetic attraction connection with the metal positioning piece (103) via the magnetic attraction mechanism (20).

3. The electronic cigarette charging apparatus according to claim 2, wherein the magnetic attraction mechanism (20) is a magnetic layer arranged on the butted curved surface, or a magnetic block fixed on the first charging electrode (2).

4. The electronic cigarette charging apparatus according to claim 2, wherein the metal positioning piece (103) is made from any material selected from iron, cobalt and nickel.

5. The electronic cigarette charging apparatus according to claim 1, wherein the second electrode (102) is arranged on an end surface of the electronic cigarette, the first charging electrode (2) is arranged at a position corresponding to the second electrode (102), and the butted curved surface is a spherical surface.

6. The electronic cigarette charging apparatus according to claim 1, wherein the butted curved surface is an annular inclined surface adapting to a shape of the first electrode (101).

7. The electronic cigarette charging apparatus according to claim 1, wherein the electronic cigarette charging apparatus further includes a first elastic sheet (3) comprising a second charging electrode (31) elastically butting against the first electrode (101) and a first connection part (32) bending from the second charging electrode (31); wherein the second charging electrode (31) is provided with a second through hole (311) for passing through the first charging electrode (2), the second through hole (311) is arranged at intervals with a circumference of the first charging electrode (2), the first connection part (32) is fixedly connected on a side wall adjacent to the first end surface (111).

8. The electronic cigarette charging apparatus according to claim 7, wherein the side wall is provided with a first elastic sheet mounting groove (13) which is provided with at least one first buckle (131); wherein the first connection part (32) is arranged with at least one first clamping groove (321) adapting to the first buckle (131), wherein the first elastic sheet (3) is buckled into the first elastic sheet mounting groove (13) via the first buckle (131).

9. The electronic cigarette charging apparatus according to claim 7, wherein the electronic cigarette charging apparatus further includes a PCB board (5) arranged with a charging circuit, wherein the main body (11) has a second end surface (112), the PCB board (5) passes through the first accommodating cavity vertically and is fixed on the second end surface (112); wherein a side of the first connection part (32) facing the PCB board (5) extends and protrudes to from a butt portion (33) which butts against the PCB board (5), one side of the second elastic sheet (4) away from the first accommodating cavity extends and butts against the PCB board (5).

10. The electronic cigarette charging apparatus according to claim 1, wherein the electronic cigarette charging apparatus is an electronic cigarette case.

11. An electronic cigarette charging apparatus for charging a battery rod (100) of an electronic cigarette, wherein one end of the battery rod (100) is provided with a first electrode (101) and a second electrode (102) both electrically connected to the electronic cigarette charging apparatus, wherein the electronic cigarette charging apparatus includes a first charging electrode (2) having a magnetic property, the first charging electrode (2) is provided with at least one butted curved surface corresponding to a position of the first electrode (101) or the second electrode (102), during a charging process, the first charging electrode (2) butts against and is in magnetic attraction with the first electrode (101) or the second electrode (102) to form a conductive connection;

wherein the electronic cigarette charging apparatus further includes a third charging electrode (6) in a form of an elastic sheet;

wherein an end surface of the first charging electrode (2) adjacent to the battery rod (100) is provided with a groove (22) adapting to the battery rod (100), the first charging electrode (2) butts against and is in magnetic attraction with the first electrode (101) of the battery rod (100) inserted into the groove (22); and wherein an end surface of the first charging electrode (2) away from the battery rod (100) is provided with a third through hole (23) communicated with the groove (22), the third charging electrode (6) passes through the third through hole (23) and butts against the second electrode (102) of the battery rod (100) inserted into the groove (22).

12. The electronic cigarette charging apparatus according to claim 11, wherein the electronic cigarette charging apparatus further includes a PCB board (5) arranged with a charging circuit, one end of the first charging electrode (2) away from the battery rod (100) is provided with a clamping groove (24) on a circumferential lateral wall, one end of the PCB board (5) butts against the clamping groove (24) to form a conductive connection.

13. The electronic cigarette charging apparatus according to claim 12, wherein one end of the third charging electrode (6) adjacent to the battery rod (100) butts the second electrode (102) to form a conductive connection, wherein one end of the third charging electrode (6) away from the battery rod (100) extends, and then bends to be fixed on the PCB board (5) to form a conductive connection.

\* \* \* \* \*